US011055340B2

(12) United States Patent
Golan et al.

(10) Patent No.: US 11,055,340 B2
(45) Date of Patent: Jul. 6, 2021

(54) SYSTEM AND METHOD FOR CREATING SYNOPSIS FOR MULTIMEDIA CONTENT

(71) Applicant: Minute Spoteam Ltd., Tel Aviv (IL)

(72) Inventors: Amit Golan, Tel Aviv (IL); Erez Eliad, Tel Aviv (IL); Maoz Melamed, Even Yehuda (IL); Nick Laniado, Tel Aviv (IL)

(73) Assignee: Minute Spoteam Ltd., Tel Aviv (IL)

( * ) Notice: Subject to any disclaimer, the term of this patent is extended or adjusted under 35 U.S.C. 154(b) by 381 days.

(21) Appl. No.: 14/505,650

(22) Filed: Oct. 3, 2014

(65) Prior Publication Data

US 2015/0134673 A1    May 14, 2015

Related U.S. Application Data

(60) Provisional application No. 61/886,225, filed on Oct. 3, 2013.

(51) Int. Cl.
*G06F 16/44* (2019.01)
*G06F 16/738* (2019.01)

(52) U.S. Cl.
CPC ............ *G06F 16/44* (2019.01); *G06F 16/739* (2019.01)

(58) Field of Classification Search
CPC ... G06F 17/30843; G06F 16/44; G06F 16/739
USPC ........................................................ 707/748
See application file for complete search history.

(56) References Cited

U.S. PATENT DOCUMENTS

| | | | |
|---|---|---|---|
| 5,930,493 A * | 7/1999 | Ottesen ............ | H04N 21/47202 348/E7.071 |
| 6,633,845 B1 * | 10/2003 | Logan .................. | G10H 1/0008 400/116 |
| 7,826,911 B1 * | 11/2010 | Bennett ............. | G06F 17/30743 700/94 |
| 9,286,938 B1 * | 3/2016 | Tseytlin ................. | G11B 27/34 |
| 2002/0083468 A1 * | 6/2002 | Dudkiewicz ....... | H04N 21/4755 725/133 |
| 2002/0120925 A1 * | 8/2002 | Logan ................ | H04N 7/17318 725/9 |
| 2005/0120368 A1 * | 6/2005 | Goronzy ........... | G06F 17/30787 725/28 |
| 2008/0215984 A1 * | 9/2008 | Manico ............. | G06F 17/30035 715/730 |
| 2010/0287473 A1 * | 11/2010 | Recesso ................... | G09B 5/00 715/716 |
| 2011/0029666 A1 * | 2/2011 | Lopatecki ........ | H04N 21/44222 709/224 |
| 2011/0153602 A1 * | 6/2011 | Kiddle .............. | G06F 17/30029 707/731 |

(Continued)

*Primary Examiner* — Kimberly L Wilson
(74) *Attorney, Agent, or Firm* — Pearl Cohen Zedek Latzer Baratz LLP

(57) ABSTRACT

A system and method for creating a synopsis or summary for a multimedia content object is described. A set of metadata objects may be associated with a respective set of segments of the multimedia content object. Portions or segments of the multimedia content object may be associated with rank values or ratings based on the metadata objects. A system and method may select to remove a portion of the multimedia content object based on an associated rank to produce a synopsis for the multimedia content object. A system and method may select portions of the multimedia content object to include in a synopsis of the multimedia content object.

26 Claims, 7 Drawing Sheets

(56) References Cited

U.S. PATENT DOCUMENTS

| | | | | |
|---|---|---|---|---|
| 2012/0317085 A1* | 12/2012 | Green | ................ | G06F 16/9535 |
| | | | | 707/704 |
| 2013/0287212 A1* | 10/2013 | Marko | .................. | H04H 20/88 |
| | | | | 381/2 |
| 2013/0297599 A1* | 11/2013 | Henshall | .............. | G06F 16/683 |
| | | | | 707/736 |
| 2014/0086553 A1* | 3/2014 | Moon | ..................... | H04N 9/87 |
| | | | | 386/239 |
| 2014/0223480 A1* | 8/2014 | Berry | ............... | H04N 21/4826 |
| | | | | 725/40 |
| 2014/0289241 A1* | 9/2014 | Anderson | ........ | G06F 17/30038 |
| | | | | 707/736 |
| 2014/0289594 A1* | 9/2014 | Iampietro | ........... | G11B 27/105 |
| | | | | 715/202 |
| 2014/0321831 A1* | 10/2014 | Olsen | .................. | G11B 27/034 |
| | | | | 386/241 |
| 2015/0020106 A1* | 1/2015 | Belyaev | ............ | H04N 21/4622 |
| | | | | 725/45 |
| 2015/0082349 A1* | 3/2015 | Ishtiaq | ............ | H04N 21/23418 |
| | | | | 725/40 |
| 2015/0296228 A1* | 10/2015 | Chen | ................ | G06F 17/30029 |
| | | | | 725/34 |

* cited by examiner

SYSTEM AND METHOD FOR CREATING SYNOPSIS FOR MULTIMEDIA CONTENT

CROSS REFERENCE TO RELATED APPLICATIONS

This application claims the benefit of U.S. Provisional Patent Application Ser. No. 61/886,225, filed on Oct. 3, 2013, entitled "Method and Apparatus for Creating Video Synopsis" which is incorporated in its entirety herein by reference.

FIELD OF THE INVENTION

The present invention relates generally to presentation of multimedia content. More specifically, the present invention relates to methods, devices and systems for creating summaries or synopses from existing multimedia content objects.

BACKGROUND

As online multimedia content services are becoming increasingly popular, users are able to watch and share video clips or other multimedia content from all over the world with ease. Users are flooded with multimedia content from various websites and social networks on a daily basis. On popular platforms, such as the YouTube platform, billions of videos and other multimedia content are watched and hundreds of thousands of videos are uploaded every day. As the number of videos uploaded each day continues to increase rapidly, users often do not have the time or patience to watch every video clip that looks interesting according to its title, description or recommendation.

A recent research on the field of online videos found that most of the online users play with the scroll bar to skip portions of videos watched or leave the video before it ends. This means that most users do not watch the whole length of the original video. However, currently, users have to watch an entire video clip before they can determine whether or not it is interesting.

SUMMARY

A system and method for creating a synopsis for a multimedia content object is described. A set of metadata objects may be associated with a respective set of segments of the multimedia content object. Portions or segments of the multimedia content object may be associated with rank or rating values based on the metadata objects. A system and method may select to remove a portion (e.g., not the entirety of) of the multimedia content object based on an associated rank to produce a synopsis for the multimedia content object. A rank may be calculated based on a source of a metadata object.

A metadata object may be associated with a property and calculating a rank may be based on the property. A portion of the multimedia content object may be selected to be included in or added to the synopsis based on a rank associated with the portion.

A synopsis may be created based on a preference of a user. A synopsis may be created based on a desired length or number of contiguous portions. Metadata may be generated by analyzing content in a web site. A system and method may determine a user is about to stop watching a multimedia content object, select a portion of the multimedia content object based on an associated rank and skip to the selected portion.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
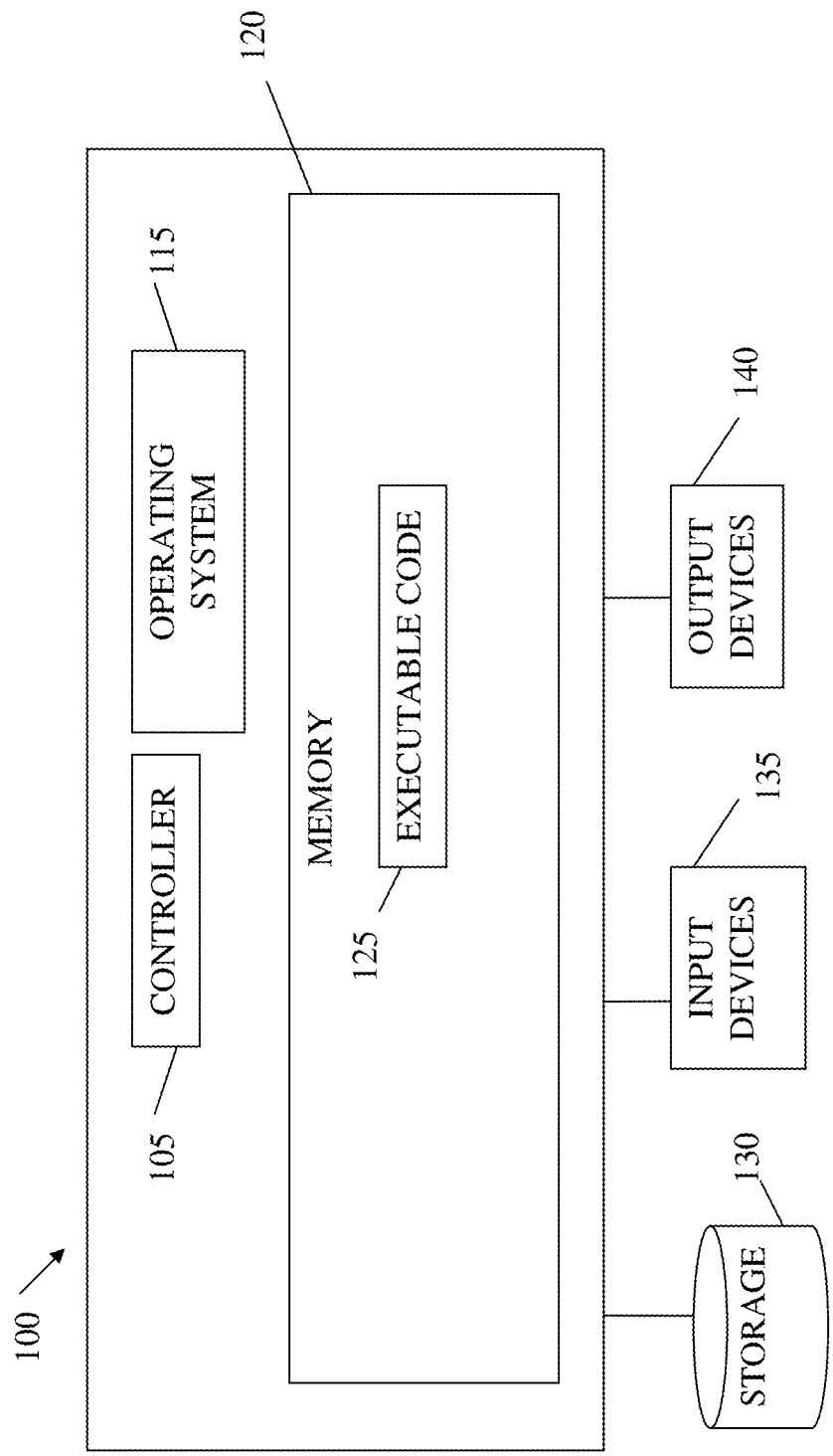
FIG. 1 shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing high level block diagram of an exemplary computing device according to embodiments of the present invention. Computing device 100 may include a controller 105 that may be, for example, a central processing unit processor (CPU), a chip or any suitable computing or computational device, an operating system 115, a memory 120, a storage 130, input devices 135 and output devices 140.

Operating system 115 may be or may include any code segment designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer or processor non-transitory storage medium, e.g., a RAM. Memory 120 may store, e.g., data such as code, software, synopses, summaries, multimedia content objects, segments, portions, etc.

Executable code 125 may be any executable code, e.g., an application, a program, a process, task or script. Executable code 125 may be executed by controller 105 possibly under control of operating system 115. For example, executable code 125 may be an application that generates a video synopsis or summary as further described herein.

Storage 130 may be or may include, for example, a hard disk drive, a Compact Disk (CD) drive, a CD-Recordable (CD-R) drive, a universal serial bus (USB) device or other suitable removable and/or fixed storage unit. Content may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more monitors, displays, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a display, a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a mobile computer, a laptop computer, a server computer, a network device, or any other suitable computing device.

Although for the sake of clarity and simplicity video clips are mainly referred to herein it will be understood that any multimedia content may be applicable. For example, a synopsis or summary for presentations, audio content and the like may be generated as described herein. Accordingly, when video clips are referred to herein it will be understood that any other multimedia content may be relevant. When used herein a video clip is typically a sequence of image frames which when viewed at a certain speed, e.g., 30 frames per second (other frame rates may be used) give the impression to the user of a moving image.

Figure 2:
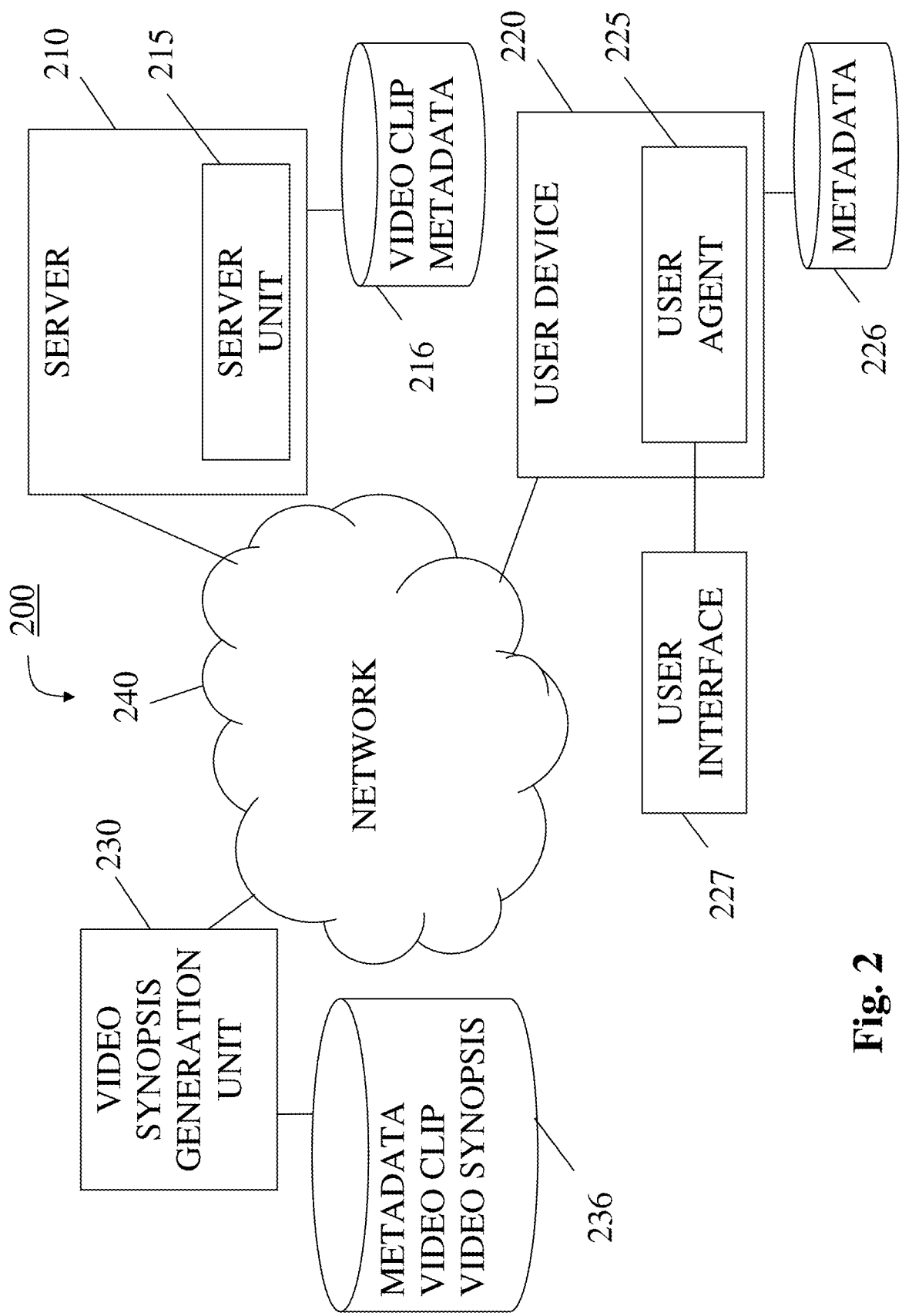
FIG. 2 shows an exemplary system according to embodiments of the invention.

Reference is made to FIG. 2 that shows an exemplary system 200 according to embodiments of the invention. As shown, system 200 may include a server 210 that may include a server unit 215. As shown, server 210 may be operatively connected to a storage 216 that may store multimedia content such as video clips and metadata objects. As further shown, system 200 may include a user device 220 that may include a user agent 225. User agent 225 may be connected to user interface 227. As described herein, user interface 227 may enable an expert or employee to create and store metadata objects for a multimedia content.

Metadata objects as referred to herein may be any suitable data structure or construct that enables storing, retrieving and modifying values. For example, a metadata object may include a number of fields that can be set or cleared, a plurality of entries that may be modified and so on. For example, a label, a rank, a grade, a quality and a priority may be set, cleared or modified in a metadata object that may be associated with a multimedia content object or with a segment or portion of the multimedia content object.

Attributes or properties of a metadata object be set in the metadata object or they may be associated with or connected to the metadata object. For example, attributes or properties such as a category (e.g., "politics", "cars"), a sub-category, a class, a family, a relevant group, a characteristic, a type or any other property or attribute may be included in a metadata object. For example, a first entry or field in a metadata object may be dedicated or used for a category, a second field may be used for setting the class and so on. Some attributes or properties may be dynamically defined. For example, in relation to a video clip that shows a soccer match, a text field may be used to associate or connected a metadata object with a parameter such as "scores", "free kicks" and so on. Accordingly, a system and method may rank metadata objects based on any associated or included attribute or property. Ranking metadata objects may be for example according to complex or composite rules, e.g. sport & soccer & (goal or foul).

In a preferred embodiment, a synopsis or summary is created by selecting portions of an input or original multimedia content object based on a ranking of metadata objects; the portions may be added to or included in the synopsis. As described, metadata objects are associated with portions, segments or time slots. Accordingly, ranking metadata objects may be effectively ranking portions, segments or time slots. For example, a rank of a metadata object of a time slot may be viewed as the rank of the time slot itself. As described, a rank of a metadata object or segment may be an ad-hoc value. For example, when ranking time slots in a video clip for an adult male, a time slot may be ranked or rated 67 (e.g., the associated metadata object has category "cars") and the same time slot may be ranked or rated 14 when ranking the video clip for a young girl.

It will be understood that any suitable object may be used as a metadata object. A plurality of metadata objects may be associated with or connected to a single multimedia object or with a segment thereof. For example, a linked list of metadata objects may be associated with a segment of a video clip. Accordingly, it will be understood that any information, related to a multimedia content object, collected and calculated as described herein may be stored in metadata objects that may be associated with the multimedia content object.

As shown, user device 220 may be operatively connected to a storage 226 that may store metadata objects. As shown, system 200 may include a video synopsis or summary generation unit 230 that may be operatively connected to a database 236. Database 236 may store metadata objects, video clips and video synopses. In an embodiment, database 236 includes a database that enables storing, retrieving and updating metadata for video clips using a key such as a Uniform Resource Locator (URL), link or an identification parameter or value (ID) associated with a video clip. For example, known in the art databases platforms such as a relational database, has-key database such as Redis or nosql may be used. Combinations of database techniques or platforms may be used. In an embodiment, database 236 is a relational database+key-value database.

Video synopsis generation unit 230 may generate a summary or synopsis for any type of multimedia content. For example, a system and method as described herein may generate a synopsis of an audio track (e.g., mp3 as known in the art) by including selected segments of the audio track in a synopsis. Similarly, a synopsis of a presentation of images (e.g., of a power point presentation as known in the art) may be generated by selecting some of the pictures or images and including selected images in the synopsis.

A synopsis of a content object as referred to herein may relate, or be, a shortened version of the content object. A synopsis as referred herein may be an outline covering or including selected portions or segments of the content object or it may be a summary of the content object. A synopsis may include portions of a multimedia content object. For example, a video synopsis may include a single, contiguous segment or portion of the video clip or it may include a number of segments of the clip. In an embodiment, a synopsis or summary of video clip is a video clip that only includes selected segments or portions of the video clip.

Server 210, user device 220 and video synopsis generation unit 230 may be devices or systems similar to device 100 described herein. For example, server unit 215, user agent 225 and video synopsis generation unit 230 may be units or modules that include or are included within a controller similar to controller 105, executable code similar to executable code 125 and a memory similar to memory 120 as described herein. Controller 105 may be configured to carry out embodiments of the invention by for example executing software or code to perform the functionality and thus include video synopsis generation unit 230, server unit 215, user agent 225 video synopsis generation unit 230 and other units or modules described herein. For example, user device 220 may be a home computer, a laptop or a smartphone and server 210 may be a web server. Video synopsis generation unit 230 may be or be part of or executed by a computer or server, or it may be a module or unit incorporated in server 210. Network 240 may be any suitable network that enables server 210, user device 220 and video synopsis generation unit 230 to communicate. For example, in one embodiment, network 240 is the Internet.

Using user device 220, a user may request a video clip from server 210 and server 210 may provide the clip from storage 216. Server unit 215 may monitor any events related to a session that involves the requested clip. For example, actions performed by a user, e.g., skip forward, skip backwards, pause and abort may be identified and/or trapped by server unit 215 and may be stored as metadata objects on storage 216 as shown. Other actions tracked and recorded in metadata may be for example an increases or decreases of the playing speed of the video, switching to full screen mode, whether or not the user is moving the mouse while watching the video and the like. Any logic may be applied. For example, identifying that the mouse is moved by the user may indicate the user is not interested in the video, in such case, the current segment may be identified and/or indicated as "not interesting" or "not important" using metadata objects as described herein. In some embodiments, tracking and recording user actions may be done in real-time, as the actions are performed, and processing recorded actions may be done in off-line mode.

Recording actions may include recording any relevant information. For example, recording a skip forward operation may include both the time skipped to and the time skipped from, recording pause and abort may include the time when pause or abort were done, the duration of a pause and so on.

Generally, a timeline of a multimedia content object may be divided into time segments or portions (or simply segments as referred to herein). For example, the timeline of a video clip may be divided into 5 second long segments and events, user actions, or other metadata may be recorded with reference to a segment. In other cases, a segment may have variable length. For example, if user agent 225 detects that, when watching a video clip, a user kept skipping back to somewhere between second 34 to second 67 of the video clip, then user agent 225 may inform video synopsis generation unit 230 that segment of 34-67 is an interesting or important segment. Metadata indicating the importance or relevance of segment 34-67 may be generated by video synopsis generation unit 230 and may be stored, e.g., on database 236. The metadata may be associated with or connected to the video clip and used to generate a synopsis for the video clip as described herein. Any information related to actions or interactions of a user may be recorded in metadata objects that may be associated with a time segment and a video clip. Metadata of a first segment or time slot may include a reference to a second segment or time slot. For example, with respect to a segment of a video clip, the following may be recorded as metadata: a reference to a segment the user skipped to from the current segment; a reference to the segment from which a user skipped to the segment; a portion (e.g., not the entirety of) of the segment actually watched by the user (and how many times). A metadata object associated with a time slot or segment may record a time or duration value. For example, a metadata object may include the number of users that continued watching from the time slot or point of a video clip for at least 10 seconds (or other length of time), an average time users stayed from time slot or point till the end of a clip, how many users abandoned the clip at a given time or point or how many users watched the entire segment. Other data in a metadata object may be a bounce rate (e.g., how many users skipped a segment, how many users chose to stop watching a video clip).

A metadata object may record or include an action performed by the user when watching the segment. For example, actions such as entering a comment, clicking a "Like" button to indicate a "like", using a "share" button to share a video clip or a segment of the clip, pressing a banner/ad etc. may all be recorded (e.g., by user agent 225). A "like" or "share" as referred to herein may be as known in the art, e.g., done by clicking a button at a web site. Comments or content from users may be, as known in the art, comments entered by users at a web site, e.g., text entered in dedicated text fields in a web site, hashtags (or #tags) as known in the art and the like. For example, using information provided by user agent 225, video synopsis generation unit 230 may update metadata objects such that the above exemplary values or properties may be included therein. Input such as "clicking" may be performed by, e.g., a user operating an input device such as a mouse; the equivalent input may be performed e.g., by touching on a touchscreen, or other methods.

A number of metadata objects may be associated with, or stored for, a single video clip. For example, a first metadata object for a video clip may be related to a first portion or segment of the clip, e.g., the portion from second 5 to second 26 and a second metadata object for the same video clip may be related to a second portion or segment of the clip, e.g., the portion or segment from second 16 to second 32. Metadata objects may be related to overlapping segments or portions of a video clip. For example, a first metadata object may be related to the segment from second 45 to second 76 and a second metadata object for the same video clip may be related to the segment from second 26 to second 98.

Actions or events such as skip forward, skip backwards, pause, change playing speed, switch to full screen and abort may be identified and/or trapped by user agent 225 and data representing these actions may be stored as or in metadata objects on storage 226 as shown. Any data stored on storage 226 or storage 216 may be transferred or copied to database 236. For example, in an embodiment, user agent 225 is a software unit (e.g., as a software development kit (SDK) module as known in the art) downloaded from server 210 with a requested video clip. User agent 225 may be specifically configured to track any action of a user related to a video clip being played or presented on user device 220. For example, whenever a user skips forward, user agent 225 may record the event together with the time the event occurred and/or any other additional information.

Metadata objects, e.g., collected by server unit 215, collected by user agent 225 or obtained from other sources as described herein may be provided to video synopsis generation unit 230. The relevant multimedia object (e.g., a video clip or a reference thereto) may also be provided to video synopsis generation unit 230. A video clip (or a reference thereto) and related metadata objects may be stored in database 236 as shown. Video synopsis generation unit 230 may use metadata and a video clip to generate a video synopsis and store the video synopsis in database 236 as shown.

Video synopsis generation unit 230 may create or generate a video synopsis in real-time or on the fly. For example, a synopsis may be generated upon request from (or on behalf of) a user such that a synopsis is generated and provided in real-time. Video synopses suitable for different user types or categories may be generated, in advance, and stored, e.g., on database 236. Accordingly different users may be offered different synopses of the same video clip.

A video synopsis may be provided to users who can watch the video synopsis, e.g., on user device 220. It will be understood that other methods or systems may be enabled by embodiments of the invention. For example, included in server 210, video synopsis generation unit 230 may generate a video synopsis in real-time, upon request. For example, using metadata and a video clip stored on storage 216, a video synopsis generation unit 230 included in server 210 may generate a video synopsis on-the-fly, upon receiving a request from a user, from user agent 225 or from any other entity.

Collecting or generating metadata may include capturing any information or event related to a presentation of a video clip. For example, user agent 225 and/or server unit 215 may identify and record user actions related to a video clip. For example, operations or actions such as skipping forward or backward, pausing a presentation, terminating a presentation or changing the playing speed of a video clip on user device 220 may be recorded. Recording an action or event may include recording additional information. For example, upon detecting a user skipped forward, user agent 225 records the relevant time or timestamp (also referred to as location herein) in the video. For example, user agent 225 records, in metadata associated with the video clip "user skipped from second 26 to second 52 of the video clip". User agent 225 may record information related to time windows, portions or segments of the video the user actually watched, for example, "user watched from second 32 to second 47". Other data recorded in metadata for a video clip may be "user skipped back to second 56 5 times" and so on. Any other action and relevant information related to an interaction of a user with a video clip may be likewise recorded. Where and when applicable, server unit 215 may record metadata similar to the metadata recorded as described with reference to user agent 225.

Metadata may be generated or collected in various ways. For example, an expert may generate and store metadata. For example, an expert or employee may use user interface 227 to create a metadata object. User interface 227 may enable entering a URL or link (that may be used as a key in database 236) and entering any metadata for the video clip pointed to be the URL. User agent 225 may receive metadata objects from user interface 227 and may process the metadata as described and/or send the metadata objects to video synopsis generation unit 230. Video synopsis generation unit 230 may update database 236 such that metadata provided by the expert is associated with the video clip and used in creating synopses as described herein.

For example, an expert or employee may watch a video clip and may annotate the clip or otherwise add metadata that may be stored, e.g., on storage 216. For example, an expert or person may generate metadata such as "the segment from second 14 to second 32 is suitable for kids", "the segment 34-57 is unsuitable for children under 8 years old" and so on.

User interface 227 may enable sharing a portion (e.g., not the whole) of a multimedia content object and may further generate or update metadata for the shared content. For example, user interface 227 may enable a user to select a portion of a video clip by marking a start point and an end point (e.g., by placing two fingers on a progress bar of a video clip, in the case a touch screen is being used). Once marked, the portion may be shared, e.g., by a "swipe up" on a touch screen as known in the art. A user sharing a portion of a video clip or other content object may be an indication that the portion is of interest. Accordingly, user interface 227 may inform user agent 215 that the shared portion is of interests and user agent 215 may update metadata for the video clip as described herein such that future synopses generated for the video clip take into account the fact that a user found the shared potion interesting.

Database 236 may enable accessing all metadata objects for a specific video clip. For example, when new information related to a video clip is received, new metadata objects may be created for the video clip or existing metadata objects may be updated database 236. Any information in metadata objects may be used when rating or ranking portions of a video clip as described herein.

As described, metadata of, or associated with a content object may be stored. Generally, any information, data, parameters or values may be included in metadata for a content object. Metadata may include any type of elements, for example, numeric values (e.g., a time length), text (e.g., a label) and so on. Metadata may be stored in metadata objects. A metadata object may be a container that includes any number of metadata elements. Accordingly, associating metadata objects with a video clip (or other content object) enables a system or method to record any information related to the video clip. For example, both information collected by user agent 225 and data generated by video synopsis generation unit 230 may be stored in one or more metadata objects associated with a video clip.

Metadata objects may be dynamically and automatically associated with or connected to a video clip or with a portion or segment of the video clip. For example, based on a message from user agent 225 that informs that, when watching a video clip, a user watched five times the segment between seconds 8 and 54, video synopsis generation unit 230 creates metadata objects, includes relevant information in metadata objects and associates the metadata objects with the segment 8/54 of the video clip. In some embodiments, a timeline of a video clip may be divided into fixed, constant or equal time slots and metadata objects may be associates with time slots. For example, to record the information in the above example, video synopsis generation unit 230 associates metadata objects with each second from 8 to 54. Video synopsis generation unit 230 may select any segment or time slot and update related metadata objects based on any event, logic.

Metadata objects associated with portions or segments of a video clip may include, or be associated with characteristics or other parameters. In an embodiment, a metadata object includes at least one of: a start time and end time. For example, a metadata object related to the time interval from second 23 to second 46 of a video clip may include fields that indicate the "23" as start time and "46" as end time of the portion or segment of the video clip for which data in the metadata object is relevant.

A source or entity that generated a metadata object, or provided data for the metadata object, may be recorded or identified in data associated with, or included in, a metadata object. For example, tags or identifications such as "expert", "user agent" or "server unit", "automated process A", "automated process B" etc. may indicate, for each metadata object, or for each entry or field in a metadata object, who created the metadata object or who updated (or created) a field in the metadata object. As described, the source or creator of a metadata object may be taken into account when generating a video synopsis based on metadata objects. For example, a rank or rating given to, or associated with a timeslot as described herein may be based on metadata associated with the timeslot and based on the source of the metadata. A rank may be given to time slots based on the user for which a synopsis is generated.

In an embodiment, a quality grade or rating may be associated with or connected to a metadata object, or a field in the metadata object may be a quality grade (e.g., a number from 1 to 10). For example, a quality grade may be based, in part, on the source or entity that generated or updated a metadata object. For example, a lower quality grade may be given to a metadata object created by (or on behalf of) a guest and a higher quality grade may be given to a metadata object created by (or on behalf of) an expert or user agent 225. Accordingly, a rank calculated as described herein may be based on the source of the metadata object. As described, video synopsis generation unit 230 may update metadata. For example, fields, values, text or other data in a metadata object may be changed. For example, a grade may change over time.

A rank or rating may be given to time slots based on the user for which a synopsis is generated. For example, user accounts may be stored on database 236 and any information related to a user may be stored in a user account. For example, a gender, age and preferences of the user may be known. When ranking segments, video synopsis generation unit 230 may use both metadata and information in a user account. For example, a synopsis related to news may be generated and, if the user (or group or type of users) for which the synopsis is generated is known to like sports, then a high rank (e.g., a high quality rank) may be given to segments that include sports events and a low rank may be given to segments related to politics. For example, a metadata object may indicate a portion or segment is related to sports, e.g., based on a tag in a web site, a comment from a user, a hashtags, information in blogs, forums, a video description etc. When discussed herein, low rank or rating is associated with certain characteristic, but in other systems "high" ranks or ratings may indicate those same characteristics; e.g., the rank or rating system may be reversed.

Any information included in metadata objects as described herein may be used in order to rate or rank a time slot, portion or segment of a multimedia content object. Any logic may be used when analyzing or processing metadata objects in order to rank a time slot, portion or segment. Generally, a rank may be generated based on a criteria, threshold or rule. For example, if the category of "sport" is of interest then the category of (or included in) metadata objects may be examined to identify relevant time slots and the rank of the relevant time slots may be set high. Complex rules may be used, for example, a high rank may be associated with time slots most relevant to goals in a soccer game, or a high rank may be associated with time slots most relevant to a an adult male interested in history. Information in metadata objects related to users who watched a video clip (e.g., gender, age, occupation etc. as collected by user agent 225 and/or server unit 215), may be used to rank or filter time slots.

A rank may be given to time slots based on a category (or other filterable items such as sub-category, tags, hashtags, gender, age, field of interest etc.). For example, if a user is interested in politics then, when generating a synopsis for the user, the categories associated or connected to with metadata objects may be examined and segments associated with metadata objects of a specific category may be given higher ranks. For example, based on a profile of a user (e.g., stored in a user account) it may be known that the user is interested in art. In such case, when ranking segments for a synopsis, segments associated with metadata objects having a category of "art" may be given a higher rank. Any other preferences of a user may be used in order to rank portions or segments. For example, when requesting a synopsis, a user may indicate an interest in a specific field or aspect or the user may indicate a dislike of, or lack of interest in, a specific topic, field or subject. By examining metadata associated with segments, video synopsis generation unit 230 may rank portions based on any input of a user and generate a synopsis that best suits the user. In a similar fashion and as described, synopses may be generated in advance based on preferences of types or groups of users. In an embodiment, a priority may be associated with a metadata object or a field in the metadata object may be a priority (e.g., important tags, filters or user clusters) Associating a priority or rank or tag with a time slot may include filtering or selecting portions, segments or time slots based on a logic that may include any rule, criteria or threshold. For example, time slots or segments may be tagged (e.g., by video synopsis generation unit 230) based on a category (e.g., "art", "history" etc.), or based on a sub-category (e.g., "history/middle ages"). Time slots or segments may be tagged based on their correlation with, or relevance to, identified trends (e.g., as in "google trends", "trending now", or "windows 10" as known in the art). Tagging or ranking of segments or time slots may be according to their relevance or suitability to age, gender, country of residence, fields of interests etc.

Using metadata objects that include all necessary information with respect to each segment or time slot, any logic or criteria may be used to tag or rank time slots as described. Tags and ranks may be used in order to generate or create a synopsis. For example, a synopsis may be generated by selecting time slots based on their associated tags or ranks. As described, a metadata object may be associated with, or relevant to, a segment or portion of a video clip (e.g., a segment or portion defined by a time interval of the clip). In an embodiment, the total number users that started watching the segment may be associated with, or included in, a metadata object of the segment. For example, the total number of users that started watching the segment from second 5 to second 13 may be included in a metadata object associated with the 5-13 segment.

In an embodiment, the actual time (e.g., in seconds) users continued to watch the segment may be associated with, or included in, a metadata object of the segment. For example, an aggregated or average time spent watching the segment may be included in a metadata object associated with the segment. Data in metadata objects may be aggregated or averaged over the time the user continued to watch the video from the segment and on.

In an embodiment, public and private data, e.g., collected from social networks (e.g., Facebook, Google+ etc.) may be associated with, or included in, a metadata object of a segment. For example, information entered by users such as ratings, social interactions, comments, "likes", "shares", "hashtags", "tags" and the like may be collected, e.g., by server unit 215, user agent 225 or by analyzing data in web pages. Collected information may be associated with, or included in, a metadata object of the segment. For example, the number of "likes" made for a segment of a video clip may be included in a metadata object associated with the segment.

Figure 2A:
FIG. 2A illustrates analysis of user input according to embodiments of the invention.
Figure 2A:
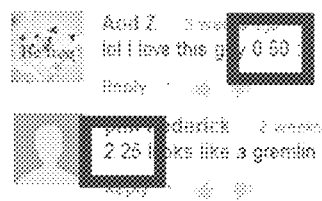
Figure 2A:
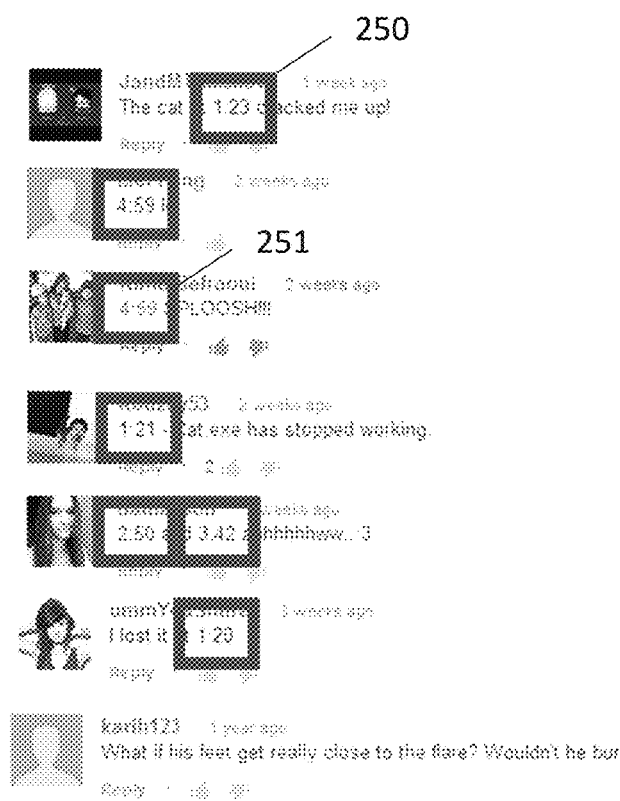
Figure 2A:
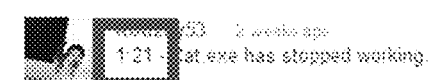
Figure 2A:
Figure 2A:
Figure 2A:
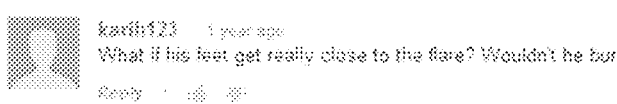
Figure 2B:
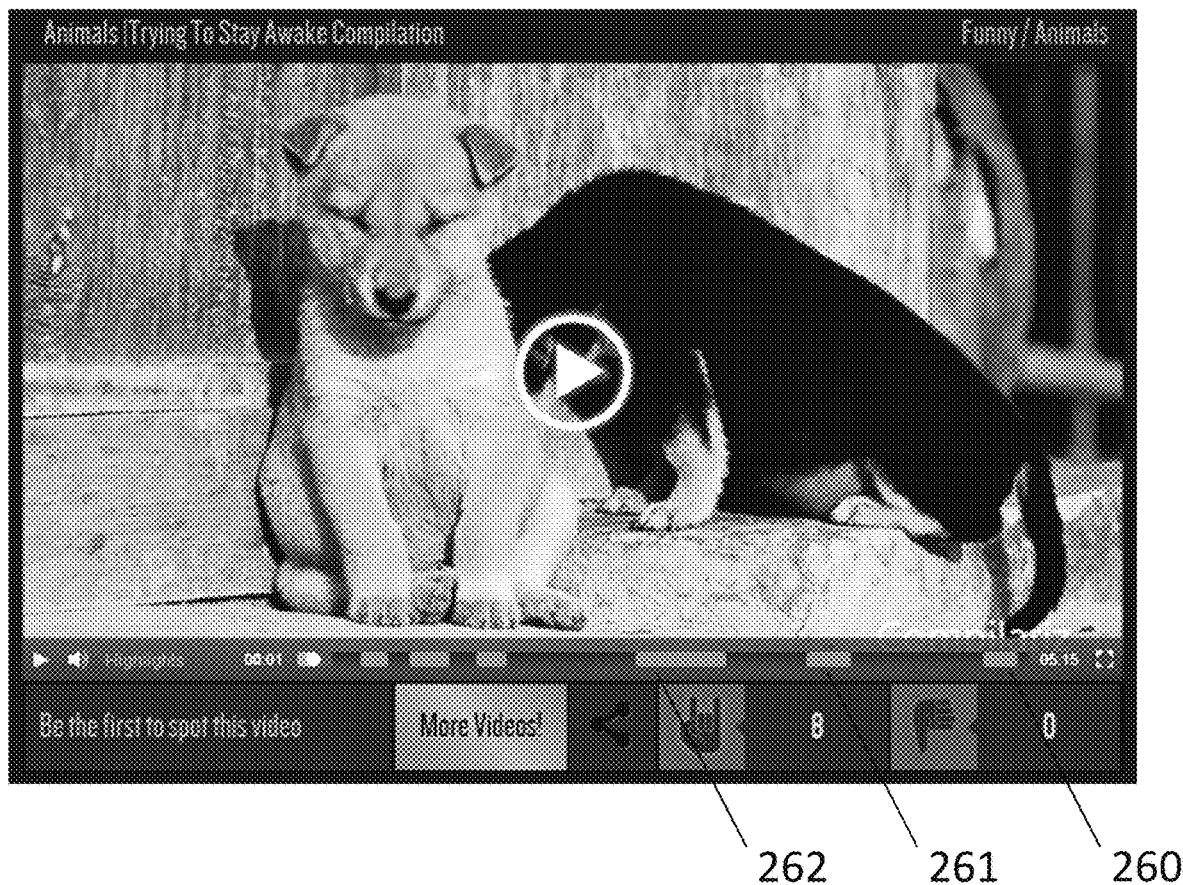
FIG. 2B graphically illustrates identifying segments according to embodiments of the invention.

Reference is additionally made to FIGS. 2A and 2B that exemplify analyzing information in a web site and marking segments of a video clip. FIG. 2A illustrates analysis of user input according to embodiments of the invention and FIG. 2B graphically illustrates identifying segments according to embodiments of the invention. As shown by timestamps 250 and 251, comments entered by users may be analyzed, timestamps entered by users may be identified, and metadata objects that indicate users found the time stamped segments interesting may be created and stored with reference to the video clip. For example, URL 252 may be used as reference or means for associating metadata information with the video clip. As shown by segments 260, 261 and 263 in FIG. 2B, interesting or important segments may be identified or determined based on comments made by users. It will be understood that any information included in users' comments may be used. For example, any text analysis, semantic analysis or other methods may be used in order to determine whether or not a user found a segment interesting, worth watching etc. Users' comments may be analyzed. For example, content in a specific portion of a web page may be analyzed using text analysis, semantic analysis, tagging, hashes etc. For example, an article about a video clip may be analyzed, interesting or relevant segments or portions of the clip may be identified (e.g., the author refers to seconds 6 to 28 of the clip) and identified segments may be recorded in metadata objects associated with the video clip. Accordingly, generating, creating or updating metadata objects may include analyzing content provided by web sites, e.g., news, articles, forums, blogs, description of videos and the like.

Any system or method may be used in order to collect information from a web site. For example, an application programming interface (API) provided by web sites (e.g., vimeo as known in the art) may be used in order to determine a category and length of a video clip or in order to identify tags associated with a video clip. For example, a category may be "sports", "art", "science" etc. As described, a category may be identified based on information provided by users who watched a video clip, by a web site hosting the clip or the source site of the clip. For example, when a video originates from a sport site it can define as a sport video. The comments of this video may define the sub category etc.

In an embodiment, a metadata object or metadata elements (e.g., fields, text or values in a metadata object) may be given, or associated with weights. For example, a weight may be used when generating a synopsis, e.g., by associating higher importance to data with higher weight. For example, if a desired length of a synopsis is known or received, then portions of an input video may be selected for inclusion in the synopsis based, at least in part, on the weight of associated metadata.

Weight of metadata may be set by a unit. For example, prior to updating a database, video synopsis generation unit 230 may examine the metadata and may set a weight of a metadata object (or element in the metadata object) according to any rule or criteria. For example, types of metadata (e.g., user comment, share, like) may be defined and weights may be associated with types (e.g. likes: 0.7, comments: 0.4, shares: 0.1). A weight may be associated in real-time. For example, weights may be given to metadata objects based on the user for which a synopsis is generated. Weights may be given or associated based on any criteria or logic. For example, weights may be selected or assigned based on a one or more criteria, e.g., one or more of: "social interactions", "user type", "user interests" and "watching time" etc.

In an embodiment, a timeline graphically displaying a list of images or events, of an input or original video clip, in chronological order, may be divided into time slots. For example, constant or predefined time slots may be used. For example, if the input or original video clip is 60 seconds long, the 60 seconds may be divided into 12, 5 seconds long time slots. Other resolutions may be used, for example, to increase resolution, 60 timeslots of 1 second each may be used for the above input or original video clip.

Metadata may be associated with time slots. For example, if server unit 215 informs video synopsis generation unit 230 that, when watching the above exemplary video clip, users spend most of the time in the time interval from seconds 5 to 12 then, assuming the timeline is divided into 5 seconds long time slots, video synopsis generation unit 230 may update metadata for time slots 2 and 3 as these timeslots cover the interval starting at second 5 and ending at second 15 of the video. For example, video synopsis generation unit 230 may create (or update) two metadata objects associated with time slots 2 and 3 and include in the metadata objects an indication that these time slots are interesting, important, watched by many users etc.

Associating metadata objects with time slots may vary in different implementations. For example, a number of metadata objects may be associated with one time slot. For example, a time slot may be associated with a number of metadata objects having different types. Metadata types may be related to types of content. For example, comments are recorded in, or as, a first type of metadata object and "likes" are recorded in, or as, a second type of metadata object and both metadata objects may be associated with the same time slot. A number of metadata objects, having different weights, may be associated with a time slot. A time slot may be associated with any number of metadata objects that may be of the same type or of different types. For example, a time slot may be associated with 56 metadata objects of type "comment", 23 metadata objects of type "tag" and so on. As described herein, to generate a synopsis, the number of metadata objects for each timeslot, and their types, may be examined. For example, a time slot may be selected to be included in a synopsis based on the number of associated metadata objects.

In another implementation, each time slot may be associated with only one metadata object and all metadata related to the time slot may be included in the single metadata object. For example, a single metadata object may record that both "likes" and comments for the time slot or it may include counters or other constructs enabling recording information from multiple messages coming from multiple sources.

A unit according to an embodiment may receive a set of metadata objects related to a respective set of segments of a multimedia content object. For example, a metadata object may be received in a message and the respective, associated or relevant segment may be indicated or included in the message. For example, in an exemplary flow, user agent 225 detects that, when watching a video clip, a user spent most of the time watching seconds 16 to 32 of a video (e.g., the user skipped back to second 16 a few times). User agent 225 may generate a message that includes a link to the video and a reference to the segment mostly watched (e.g., in the form of start/end timestamps, e.g., (16,32) in the example above) and sends the message to video synopsis generation unit 230.

In this exemplary flow, video synopsis generation unit 230 locates the entry for the video clip using the link, and updates database 236 by associating metadata objects with time slots that cover the 16-32 interval. For example, if time slots of 5 seconds are used, video synopsis generation unit 230 may associate metadata objects that reflect the information in the message with time slots 4 to 7 (since, in this example, these time slots cover the time range or interval from second 15 to second 34). It will be understood that similar messages may be sent from server unit 215, an expert or an automated process, e.g., a crawler may examine web pages, identify comments made with respect to a video clip and generate messages usable for updating metadata as described. Any other information collected or generated by server unit 215, user agent 225, experts or other entity may be used in order to create or update metadata objects for time slots as described.

Figure 3:
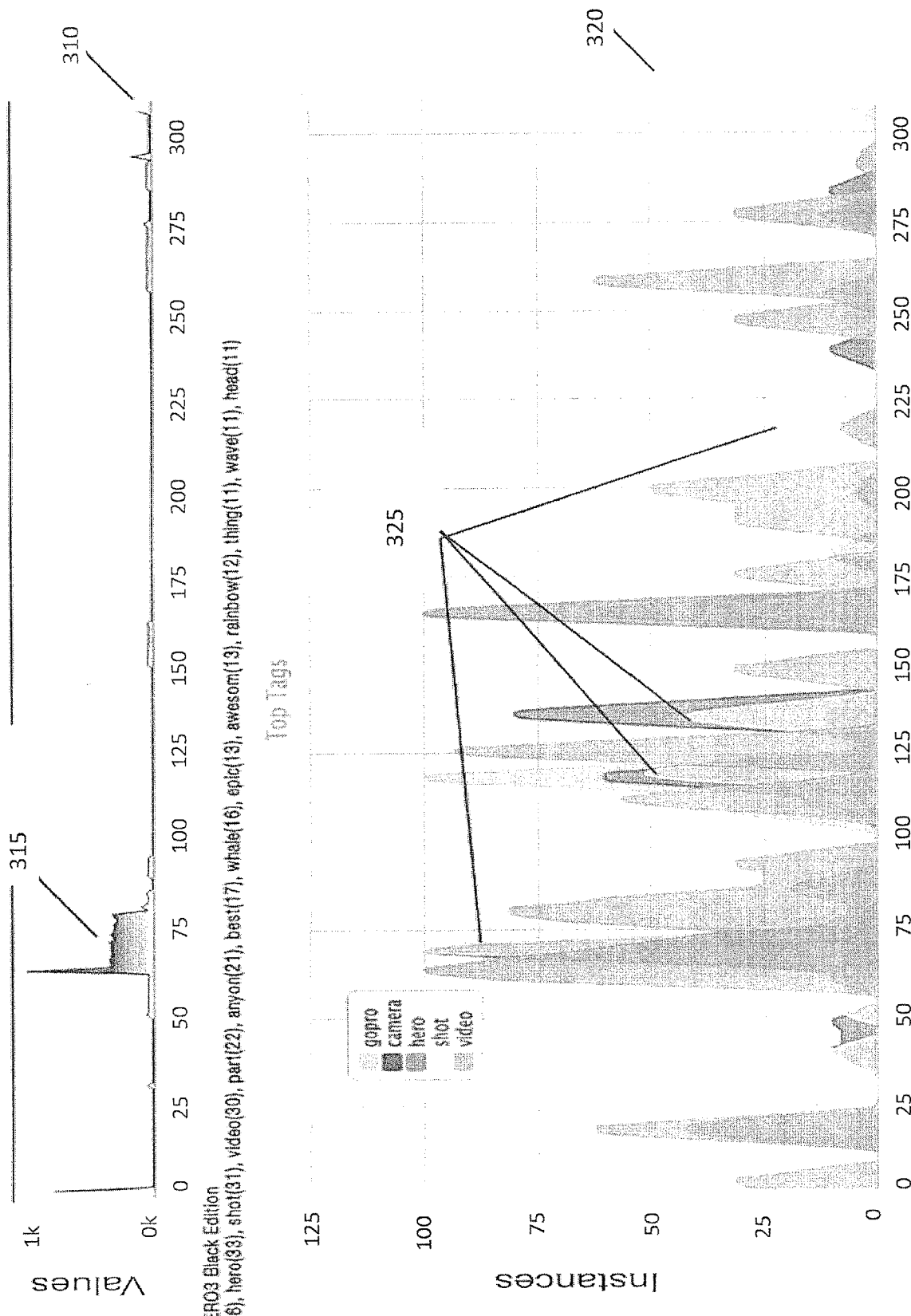
FIG. 3 shows exemplary graphs according to embodiments of the present invention.

Reference is made to FIG. 3 which shows exemplary graphs according to embodiments of the present invention. As shown by peak 315 in graph 310, the portion of a video clip that received highest attention from users may be identified. For example, based on input from units such as user agent 225 or server unit 215, a large number of metadata objects that indicate that users actually watched the segment are associated with time slots that cover the portion from second 65 to second 80 of the video. Graph or curve 310 may be produced based on the number of metadata objects associated with time slots as described. For example, to generate a video synopsis, a portion of the original video that starts at second 65 and ends at second 80 may be produced. As shown by graphs or curves 320, a plurality of curves 325 may be generated for a plurality of types of metadata. For example, with relation to a soccer game, metadata types of "shot", "hero", "camera" and the like may be used. Time slots may be associated with any number of metadata objects of any type. For example, if a comment of a user is "what a splendid shot at second 68" then a metadata object of type "shot" is associated with a time slot that includes second 68 (e.g., time slot 65-69). For example, comments made or entered by users at a web site may be examined as described in order to generate an exemplary metadata object as in the above example.

As graphically shown by graphs 320, a system and method may selectively use metadata objects, e.g., only take a specific type of metadata object into account. Accordingly and as shown, distribution of different metadata objects may be identified, presented and used. For example, if a preference or priority of a user requesting a synopsis is "shots" (the user is only interested to see shots), then a synopsis for that user may include the portions in seconds 60-70, 110-125, 130-140 and 210-220.

Figure 4:
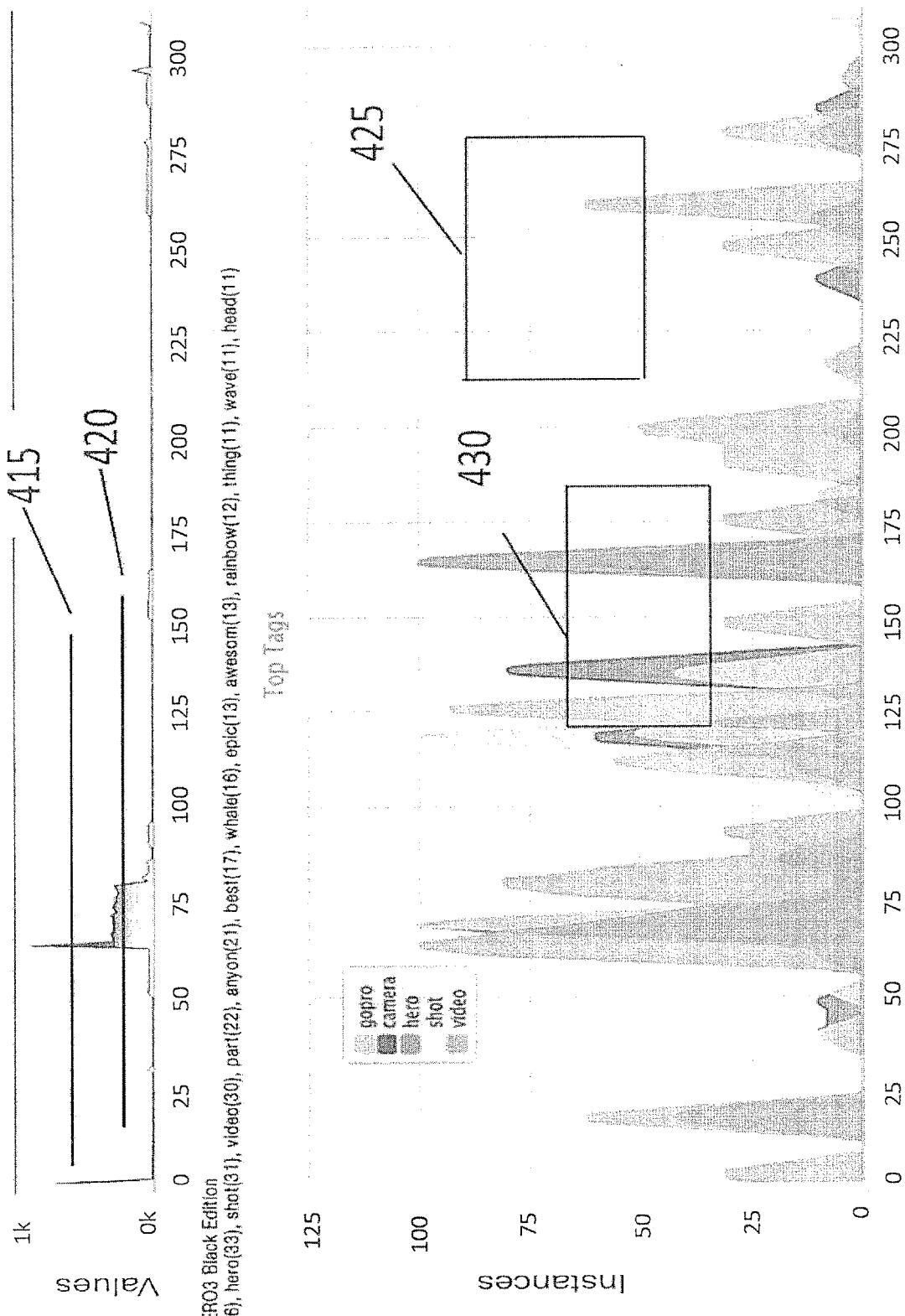
FIG. 4 shows exemplary graphs according to embodiments of the present invention.

Reference is additionally made to FIG. 4 that shows exemplary graphs according to embodiments of the present invention. To produce a synopsis based on a desired time or length, a bar may be lowered on a graph or curve until a desired length of a relevant portion of an original video is defined. For example, to produce a synopsis that is 2 seconds long, a bar may be lowered as shown by line 415 such that the width of the peak crossed by line 415 is 2 seconds. As shown the time interval for the 2 seconds synopsis may be readily determined to be seconds 60 to 62. Similarly, to produce a synopsis that is 20 seconds long, the bar may be lowered as shown by line 420 such that the width of the peak crossed by line 420 is 20 seconds. As shown, the time interval for the 20 seconds synopsis is seconds 60 to 80.

Video synopsis generation unit 230 may process metadata and update metadata objects according to a result or function. For example, video synopsis generation unit 230 may receive metadata for discrete time slots, e.g, for specific seconds of a clip. Video synopsis generation unit 230 may receive metadata from different sources (e.g., user agent 225 and a crawler that analyzes web pages). Different sources may use different values or scales. Video synopsis generation unit 230 may normalize discrete values using a mathematical function (e.g., using the Exponential Moving Average function known in the art). Accordingly, a contiguous or smooth curve describing or representing metadata information may be generated as shown by FIGS. 3 and 4.

To produce a synopsis based on a desired time or length the synopsis may be formatted such that is played in slow motion, fast forward, skip backwards and so on. Accordingly, a desired time criteria may be met by changing attributes of the synopsis.

In some cases, a system or method may prune a synopsis, e.g., in order to meet a time constraint. For example, lowering a line as described may match two segments of 5 and 8 seconds, resulting a 13 seconds long clip. If the desired time is 10 seconds then the resulting 13 seconds long clip may be pruned to produce a 10 seconds long clip.

A sliding window as referred to herein may be as known in the computer science art. Generally, a sliding window is a technique for iteratively processing portions of content. For example, a sliding window of 5 seconds may be repeatedly or iteratively translated or shifted (e.g., by a processor as described herein) over curves 325 and the values of the curves in the window, in each iteration, may be examined (e.g., by the processor). A sliding window or other method may be used in order to generate a synopsis that includes a desired, minimal or maximal number of contiguous portions of the multimedia content object. In another example, a percent may be received or used as a criteria. For example, a synopsis that includes 46% of an original video clip may be created by selecting segments that cover 46% percent of the clip, e.g., selecting the top ranked segments that make up 46% of the clip. For example, as shown by window 430, the portions related to hero and video are not contiguous and therefore a synopsis in this case may include two contiguous portions. By moving a window along a histogram and or changing the size of the window, a system or method may generate a synopsis that includes no more than a desired or minimum number of portions such that the number of non-contiguous portions is met. For example, a desired number of contiguous portions of the multimedia content object to be included in the synopsis may be received.

In another embodiment, a sliding window may be used. For example, window 425 may be moved along a histogram as shown and the content inside the window may be analyzed. Using the sliding window, locations or time intervals in a video may be identified. A synopsis may be generated by identifying portions of a video clip using the sliding window. As described, complex rules or criteria may be used. For example, if a user is interested in both hero and shots in one portion then a window may be moved along a histogram until both pick for hero and pick for shots are covered by, or included in the window as shown by window 430. As shown, the time interval for this example may be readily identified as second 103 to second 180.

A metadata object related to a segment of a multimedia content object may include, or be associated with, a quality rating or grade. For example, a quality grade representing the quality of the metadata object may be calculated (e.g., by user agent 225 or by video synopsis generation unit 230 based on the entity that created or provided the metadata object. For example, a high quality grade may be given to a metadata object received from an expert and a low quality grade may be given to a metadata object generated based on monitoring actions or input of an unknown user. For example, based on the source of a message that includes a metadata object, video synopsis generation unit 230 may set the quality of the information in the metadata object. The quality grade may be updated over time, e.g., based on new metadata or new logic used in analyzing metadata, and may be fine-tuned in real time.

A metadata object related to, or associated with, a segment of a multimedia content object may include, or be associated with, a category. For example, a category may be a gender (male/female), a field of interest (e.g., sports, politics, art), etc. A category may be a location (e.g. Israel, Tel-Aviv), language, age group, working place, hobbies, economic status, income, religion, political view, device type (mobile/desktop/tablet) etc. For example, when a user watches a video clip on a web site, user agent 225 may examine data in the web site and determine that the video clip is related to sports or politics (e.g., using any text analysis known in the art). Any information, e.g., comments from other users at the web site, tags associated with multimedia content and the like may be examined and used in order to associate a metadata object with a category. For example, if the multimedia content is presented in a web site known to be related to sports then the category for a metadata object may be set to "sports". In another case, an expert may set the category manually.

A quality grade or rating representing the quality of the metadata object may be calculated (e.g., by user agent 225 or by video synopsis generation unit 230) based on the entity that created or provided the metadata object. For example, a high quality grade may be given to a metadata object received from an expert and a low quality grade may be given to a metadata object generated based on monitoring actions or input of an unknown user. For example, based on the source of a message that includes a metadata object, video synopsis generation unit 230 may set the quality of the information in the metadata object. The quality may be taken into account when calculating a rank for a time slot as described herein.

A priority or preference may be received, determined or calculated and may be used for ranking time slots or portions of a multimedia content object as described herein. For example, a priority or preference may be a gender, a hobby, a field of interest and the like. For example, if the priority or preference received with a request to generate a synopsis for a video is politics, then the rank of portions of video related to politics may be set to a high value. A priority or preference may indicate unwanted content. For example, if a priority or preference indicates that violence is to be excluded then the rank of portions of a video that include violence may be set to a low value.

A unit according to an embodiment may associate portions of a multimedia content object with respective rank values based on metadata. In one embodiment, a unit (e.g., video synopsis generation unit 230) divides the time line of a multimedia content object into time slots (e.g., 1 or 5 seconds time slots as described herein) and associates at least some of the time slots with a rank.

A rank of a time slot may be set based on metadata of the time slot and based on a rule or criteria and based on a priority or preference. For example, a quality or source of the metadata may be used to calculate a rank. For example, a rank may be higher if the relevant metadata was received from an expert and lower if the metadata was received from an anonymous user.

For example, a criterion for ranking time slots may be a popularity (e.g., as determined by the number of users who watched a video clip or the total watch time for a segment in a video clip). A criterion for ranking time slots may be a bounce rate for a segment. A bounce rate as known in the art is the ratio or rate of users who stopped watching a clip. As described, the number of users who watched a segment may be recorded (e.g., by a large set of user agent 225 units on a respective large set of users' computers) using metadata objects associated with a time slot. In an embodiment, video synopsis generation unit 230 uses metadata information to calculate or summarize the total watch time for each time slot and then normalizes the total watch time of each time slot according to a priority, preference and/or quality grade to generate a rank for a time slot. For example, the total watch time may be an aggregation of the time spent by all users watching a segment of a video clip. Complex rules or criteria may be used. For example, a criterion may be a specific segment a user skipped to from the segment.

It is noted that some of the information used for ranking a time slot may be obtained from metadata and other information may be received, and used, for each specific synopsis. For example, based on the same metadata, a first synopsis for a video clip, generated for a young boy may be generated based on preferences received from the boy, and another, different synopsis may be generated for an elderly woman based on preferences received from the woman. Since, as described, metadata that includes any relevant information may be available, a user agent 225 unit may, using the same metadata, generate different synopses for a given content object based on user preferences or priorities. Accordingly, based on metadata objects associated with time slots and based on priorities or preferences, a rank may be associated with each time slot of a video or other multimedia content object.

In another embodiment, case or scenario, a criterion for ranking time slots may be the total number of users who started watching a segment, and how many seconds the users continued watching the segment. As described, metadata associated with time slots (e.g., generated based on metadata related to segments as described) may include an indication a user started watching the relevant segment (and therefor, the time slot) and an indication a user skipped from the segment to another segment, or terminated watching video at the segment.

In an embodiment, video synopsis generation unit 230 uses metadata information to rank each time slot according to watching percentage of the time slot (e.g., the relative time spent watching the time slot with respect to watching the entire video clip), percentage or number of users who continued to watch a video from the time slot on, how long users watched the video from the time slot.

In another embodiment, case or scenario, a criterion for ranking time slots may include public and private data, e.g., tags, ratings, views, social interactions or content such as comments, likes, shares and the like. For example, weights may be associated (e.g., based on a configuration list or file) with types of information as described herein and ranking a time slot may be based on a weight of the different types of data associated with the time slot. Accordingly, a system and method according to embodiments of the invention may generate a ranked set of time slots representing a multimedia content object where the time slots are ranked according to one or more rules or criteria. As described, a number of ranked sets of time slots may be generated according to a respective set of rules or criteria.

Ranked time slots may be used to generate a synopsis. For example, time slots with high rank may be selected for inclusion in a synopsis, or time slots with low rank may be selected for removal or deletion from a content object such that the remaining time slots are the synopsis. Any rule or criterion may be used when generating a synopsis based on ranked time slots.

Provided with data maintained in database 236 as described herein (e.g., time slots and associated metadata objects), user agent 225 may interactively offer or present content to a user. For example, user agent 225 may use a link to a video watched by a user to request from video synopsis generation unit 230 any relevant metadata filtered for the user (e.g., a synopsis according to preferences of the user). Using the metadata, user agent 225 may determine portions of the video clip that may be of interest to the user. In an exemplary scenario, user agent 225 may determine the user is about to (e.g., will very soon) stop watching the video or leave the clip, for example, when a user starts fast-forwarding the clip or skipping portions of the clip more than a predefined number of times, and in response may select a portion of the video (e.g., based on an associated rank) and may skip the display of the video to the selected portion or suggest to the user to skip to the selected portion. In another example, upon detecting a user is about to leave the clip, user agent 225 may suggest to wait x more seconds because something interesting is about to come (e.g., using a popup/tooltip window as known in the art).

Figure 5:
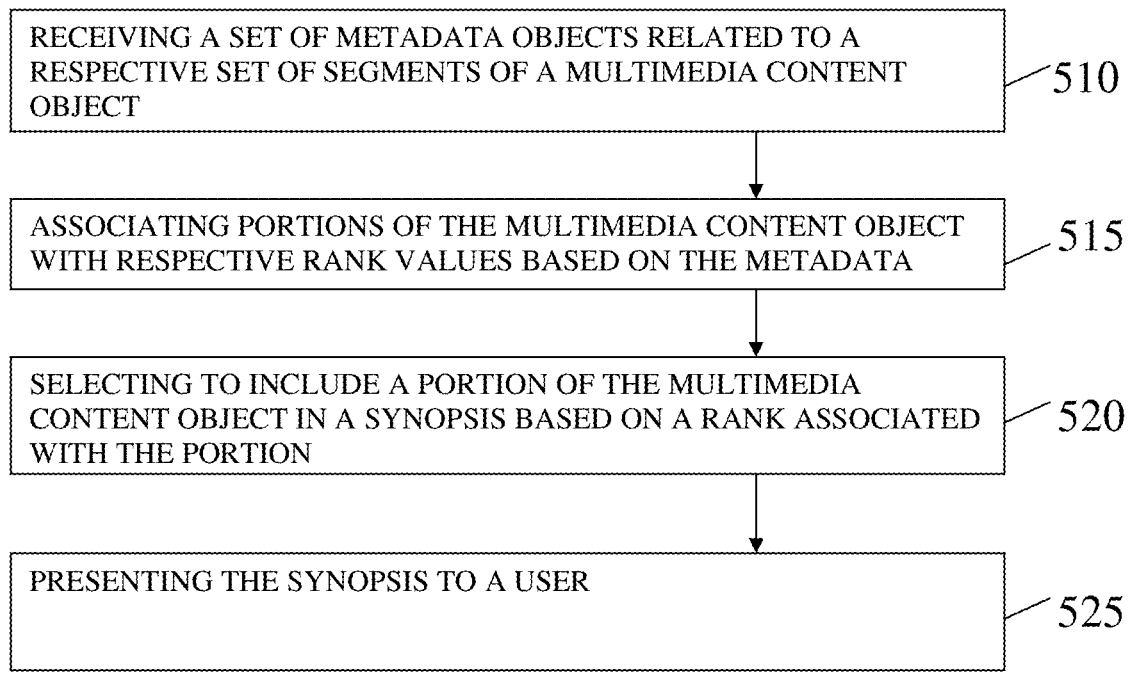
FIG. 5 is a flowchart describing a method according to embodiments of the invention.

Reference is made to FIG. 5, a flowchart describing a method according to embodiments of the invention. As shown by block 510, a method or flow may include receiving a set of metadata objects related to a respective set of segments of a multimedia content object. For example and as described, user agent 225 creates metadata objects related to segments of a multimedia content object and video synopsis generation unit 230 receives metadata objects from user agent 225. In another example, video synopsis generation unit 230 creates metadata objects related to segments of a multimedia content object based on messages from user agent 225.

As shown by block 515, a method or flow may include associating a set of portions of the multimedia content object with a respective set of rank values or ratings based on the metadata objects. For example, to associate a portion with a rank, a rank may be included in a metadata object that is associated with the portion.

In one embodiment, associating a rank with a portion of a multimedia content object may include updating metadata related to the portion. For example, to associate a time slot with a rank (or rank a time slot, segment or portion) of a video clip, video synopsis generation unit 230 may update a field or a parameter in a metadata object that is linked to, or associated with the time slot. For example, a field or entry in a metadata object may be a "RANK" field that may be set by video synopsis generation unit 230 to a number representing a rank (e.g., in the range of 1-100). For example, time slots are associated with rank values based on associated metadata objects as described. As shown by block 520, a method or flow may include selecting to include a portion of the multimedia content object in a synopsis based on a rank or rating associated with the portion. For example, video synopsis generation unit 230 selects the highest ranked portions and includes then in a synopsis as described. As described, in another embodiment, rather than or in addition to selecting portions to be included in a synopsis, portions may be selected for removal or deletion (e.g., selected to remove) from an original video clip such that the remaining portions make up the synopsis. For example, to produce a synopsis, time slots, portions or segments associated with low rank values or rank values below a certain threshold may be removed or deleted from a clip such that the remaining portions are the synopsis. To produce a synopsis, segments or time slots associated with high rank values may be selected for inclusion in the synopsis. For example, a synopsis may be a new video clip that includes selected time slots.

As shown by block 520, a method or flow may include presenting or displaying the synopsis to a user. For example, a synopsis generated as described herein may be downloaded to user device 220 and displayed on a monitor of user device 220.

Feedback from users may be used to improve a process of generating synopses. For example, after or during a presentation of a synopsis, a user may mark or indicate segments that should be removed. Video synopsis generation unit 230 may use feedback from users, e.g., by lowering a rank (e.g., reducing the value or a rank or rating) of a segment indicated as redundant or not interesting. Users may be prompted, during or after a presentation of a synopsis, to tag interesting portions of the synopsis or suggest a synopsis by marking segments (e.g., by simultaneously touching a start and end point on a progress bar). A number of synopses may be created for the same multimedia content object and feedback from users may include a rating of the synopses. For example, a number of synopses may be created for a video segment depicting a soccer game and the one selected as best by a majority of users may be provided in a web site or suggested to additional users.

In operation 525 the synopsis may be presented to the user. A synopsis may be used or presented in various ways. For example, a publisher may associate a synopsis of a video clip with the video clip itself, such that when a user accesses the video clip (e.g., presses a link thereto), the synopsis is displayed to the user, e.g., on a monitor, thus raising the interest of the user to watch the video clip. In such embodiment, clicking on the synopsis may cause a presentation of the entire video clip. For example, rather than showing or listing video clips as thumbnails as done by known systems and methods, synopses of video clips may be presented.

A web page or application may present a plurality of synopses and, when a synopsis is clicked or selected by a user, a presentation of the entire relevant video clip may commence. A synopsis may be downloaded, shared or otherwise used using systems and methods for downloading, sharing or otherwise using video clips as known in the art.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of creating a synopsis for a multimedia content object, the method comprising:
   creating, by a server, a set of metadata objects associated with a respective set of portions of the multimedia content object and storing the metadata objects in a database, wherein a metadata object is a container including at least three elements selected from the group consisting of: a start time, an end time, a rank, a category, information generated based on an interaction of a user with a web site and information generated by analyzing content in a web site;
   recording, by the server and while presenting the multimedia content to a user, interactions of the user with the presented multimedia content;
   updating, in at least some of the metadata objects, a rank value, wherein the rank value is set according to a level of interest of the user in respective at least some of the portions, wherein the level of interest is determined based on:
      the recorded interactions, and
      at least one of:
         an interaction of the user with the server, and
         information entered by users, at a web site, with respect to the multimedia content, and
   selecting to remove a portion of the multimedia content object based on a rank value in an associated metadata object to produce a synopsis for the multimedia content object.

2. The method of claim 1, comprising selecting to include a portion of the multimedia content object in the synopsis based on a rank associated with the portion.

3. The method of claim 1, comprising:
   dividing a time line of the multimedia content object into time slots and associating at least some of the time slots with at least one metadata object;
   calculating ranks for at least some of the time slots based on a quality of related metadata; and
   producing the synopsis by selecting some of the time slots based on their ranks.

4. The method of claim 1, wherein a metadata object related to a first portion includes at least one of:
   a reference to a second portion,
   a duration value, and
   an indication of an action performed by the user.

5. The method of claim 1, comprising receiving a desired length for the synopsis and selecting to remove portions of the multimedia content object such that the synopsis is according to the desired length.

6. The method of claim 1, comprising receiving a desired number of contiguous portions of the multimedia content object to be included in the synopsis and producing the synopsis according to the desired number.

7. The method of claim 1, comprising generating the metadata by analyzing content in a web site.

8. The method of claim 1, comprising:
   determining the user is about to stop watching the multimedia content object;
   selecting a portion of the multimedia content object based on an associated rank; and
   skipping to the selected portion.

9. The method of claim 1, comprising associating the set of metadata objects with a single portion of the multimedia content object.

10. The method of claim 1, comprising presenting the multimedia content object to the user based on at least some of the metadata objects and based on the interaction of the user with the multimedia content object.

11. The method of claim 1, wherein associating portions of the multimedia content object with respective rank values is based on the type of the user.

12. The method of claim 1, comprising:
associating a set of quality grades with a respective set of metadata objects based on a source of information included in the metadata objects; and
associating portions of the multimedia content object with respective rank values based on the associated quality grades.

13. The method of claim 1, wherein the level of interest is determined based on user generated content entered by the user in association with the multimedia content.

14. The method of claim 1, comprising associating portions of the multimedia content object with respective rank values based on an association of metadata objects with a category.

15. The method of claim 1, wherein the interaction with the server includes at least one of: skipping forward, skipping backwards, pausing a presentation of the multimedia content, aborting or terminating a presentation of the multimedia content, changing playing speed of the multimedia content and switching to full screen mode.

16. The method of claim 1, wherein an interest of a user in a portion of the multimedia content object is determined based on at least one of: the number of times the portion was skipped to, and a pause time on the portion.

17. The method of claim 1, wherein a first metadata object is associated with a first portion and a second metadata object is associated with a second portion and wherein the first and second portions overlap in time.

18. A system for creating a synopsis for a multimedia content object, the system comprising:
a hardware memory; and
a hardware controller, the controller configured to:
create a set of metadata objects associated with a respective set of portions of the multimedia content object and store the metadata objects in a database, wherein a metadata object is a container including at least three elements selected from the group consisting of: a start time, an end time, a rank, a category, information generated based on an interaction of a user with a web site and information generated by analyzing content in a web site;
record, while presenting the multimedia content to a user, interactions of the user with the presented multimedia content;
update, in at least some of the metadata objects, a rank value, wherein the rank value is set according to a level of interest of a user in respective at least some of the portions, wherein the level of interest is determined based on:
the recorded interactions, and
at least one of:
an interaction of the user with a server, and
information entered by users, at a web site, with respect to the multimedia content; and
select to remove a portion of the multimedia content object based on a rank value in an associated metadata object to produce a synopsis for the multimedia content object.

19. The system of claim 18, wherein the rank is calculated based on a source of information included in the metadata object.

20. The system of claim 18, wherein the controller is configured to select to include a portion of the multimedia content object in the synopsis based on a rank associated with the portion.

21. The system of claim 18, wherein the controller is configured to:
divide a time line of the multimedia content object into time slots and associate at least some of the time slots with at least one metadata object;
calculate ranks for at least some of the time slots based on a quality of related metadata; and
produce the synopsis by selecting some of the time slots based on their ranks.

22. The system of claim 18, wherein a metadata object related to a first portion includes at least one of:
a reference to a second portion,
a duration value, and
an indication if an action performed by the user.

23. The system of claim 18, wherein the controller is configured to receive a desired length for the synopsis and select to remove portions of the multimedia content object such that the synopsis is according to the desired length.

24. The system of claim 18, wherein association of portions of the multimedia content object with respective rank values is based on the type of the user.

25. A system for creating a synopsis for a multimedia content object, the system including a server, the server comprising:
a hardware memory; and
a hardware controller, the controller configured to:
create a set of metadata objects associated with a respective set of portions of a multimedia content object and store the metadata objects in a database, wherein a metadata object is a container including at least three elements selected from the group consisting of: a start time, an end time, a rank, a category, information generated based on an interaction of a user with a web site and information generated by analyzing content in a web site;
record, while presenting the multimedia content to a user, interactions of the user with the presented multimedia content;
update, in at least some of the metadata objects, a rank value, wherein the rank value is set according to a level of interest of the user in respective at least some of the portions, wherein the level of interest is determined based on:
the recorded interactions, and
at least one of:
an interaction of the user with the server, and
information entered by users, at a web site, with respect to the multimedia content;
use a criteria and information in each of the metadata objects to associate rank values with portions of the multimedia content object, and
include a portion of the multimedia content object in a synopsis of the multimedia content object based on a rank value in a metadata object associated with the portion.

26. The system of claim 25, wherein association of portions of the multimedia content object with respective rank values is based on the type of the user.

\* \* \* \* \*